US012555960B2

(12) United States Patent
Liu

(10) Patent No.: US 12,555,960 B2
(45) Date of Patent: Feb. 17, 2026

(54) SHELL GROUNDING STRUCTURE OF ELECTRICAL CONNECTOR

(71) Applicant: ACES ELECTRONICS CO., LTD., Taoyuan (TW)

(72) Inventor: Yuan-Huang Liu, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 281 days.

(21) Appl. No.: 18/509,684

(22) Filed: Nov. 15, 2023

(65) Prior Publication Data

US 2025/0158334 A1 May 15, 2025

(51) Int. Cl.

| | |
|---|---|
| ***H01R 12/24*** | (2006.01) |
| ***H01R 12/71*** | (2011.01) |
| ***H01R 13/502*** | (2006.01) |
| ***H01R 13/633*** | (2006.01) |
| ***H01R 13/6582*** | (2011.01) |
| ***H01R 13/6594*** | (2011.01) |

(52) U.S. Cl.

CPC ....... *H01R 13/6582* (2013.01); *H01R 12/716* (2013.01); *H01R 13/502* (2013.01); *H01R 13/6335* (2013.01); *H01R 13/6594* (2013.01)

(58) Field of Classification Search

CPC ... H01R 13/6582; H01R 12/716; H01R 12/79

See application file for complete search history.

(56) References Cited

U.S. PATENT DOCUMENTS 4,927,376 A * 5/1990 Dickie .................. H01R 24/28 439/484
6,830,478 B1 * 12/2004 Ko ...................... H01R 12/598 439/607.41
6,840,798 B2 * 1/2005 Kobayashi ............ H01R 13/04 439/607.41
7,220,146 B2 * 5/2007 Miyazaki ............ H01R 12/775 439/402
7,309,237 B2 * 12/2007 Kuo .................. H01R 13/6593 439/495
7,377,803 B2 * 5/2008 Matsuoka ........... H01R 12/598 439/497
7,722,387 B2 * 5/2010 Yamaji .................. H01R 12/00 439/497
7,946,882 B2 * 5/2011 Wu ..................... H01R 13/648 439/607.41
8,043,114 B2 * 10/2011 Kaneko ............... H01R 12/775 439/468

(Continued)

*Primary Examiner* — Neil Abrams

(74) *Attorney, Agent, or Firm* — MUNCY, GEISSLER, OLDS & LOWE, P.C.

(57) ABSTRACT

A shell grounding structure of electrical connector includes: a board-end connector including a housing with a docking space, conductive terminals pierced on both sides of the docking space, and a metal shell assembled on the housing; and a wire-end connector including a holder base with a bottom inserting portion combined with the docking space, contact terminals piercing the inserting portion in contact with the respective conductive terminals and connected with respective electrical cables, and a shielding shell having a cable opening for the cables to be exposed and a hooking plate provided with resisting elastic pieces extending toward the metal shell and forming contact.

7 Claims, 5 Drawing Sheets

(56) References Cited

U.S. PATENT DOCUMENTS

| | | | | |
|---|---|---|---|---|
| 8,388,370 | B2 * | 3/2013 | Yamaji | H01R 12/82<br>439/497 |
| 9,287,643 | B2 * | 3/2016 | Yoshida | H01R 12/716 |
| 9,425,564 | B2 * | 8/2016 | Yamaguchi | H01R 24/40 |
| 10,741,973 | B2 * | 8/2020 | Yufu | H01R 12/79 |
| 11,128,092 | B2 * | 9/2021 | Yang | H01R 13/6273 |
| 11,177,598 | B2 * | 11/2021 | Chi | H01R 12/7023 |
| 11,469,530 | B2 * | 10/2022 | Guo | H01R 13/512 |
| 2006/0172589 | A1 * | 8/2006 | Watanabe | H01R 13/6582<br>439/495 |

* cited by examiner

SHELL GROUNDING STRUCTURE OF ELECTRICAL CONNECTOR

BACKGROUND OF THE INVENTION

1. Field of the Invention

The present invention relates to electrical connector technology, and more particularly to a shell grounding structure of electrical connector, wherein the hooking plate of the shielding shell of the wire-end connector has a large volume, so that the multiple resisting elastic pieces set in it can all allocate a large space, and each resisting elastic piece can be designed to be relatively wide and thick, and the free end forms a resisting surface that is vertically attached to the surface of the metal shell of the board-end connector, and the board-end and wire-end connectors can maintain their original shape after repeated plugging and unplugging without deformation. The resisting contact structure between the metal shell and the shielding shell can then be confirmed, so that the shell grounding structure of electrical connector has a good effect of electromagnetic wave shielding and elimination.

2. Description of the Related Art

General connectors are used in electronic signal and power connection components and their accessories. The main function is to provide connections between various electronic devices or equipment, and to ensure accurate signal transmission. With the application of different products, power and use of the environment, connectors have developed various types, and can be widely used in consumer electronics products such as computers, notebook computers, smart phones, or household appliances, telecommunications and communication equipment and other fields. Because the design of electronic products nowadays tends to be light, thin, short and small, the connectors inside various electronic products need to be greatly reduced accordingly. In contrast, it is bound to be more difficult to connect and fix thin connectors with general wires or flexible circuit boards.

Furthermore, as the volume of electronic products becomes thinner and thinner, the structure of components mounted on circuit boards inside electronic products needs to be more precise and miniaturized, and the overall structural strength also needs to be strengthened accordingly. General connectors (such as board-to-board connectors or wire-to-board connectors, etc.) usually use a male-end connector and a female-end connector for mating and docking, and the signal or power is transmitted to the control circuit through the circuit board to perform the corresponding operation function. However, when the male-end connector and the female-end connector are docked, in order to reduce the overall structural height, most of them are assembled by fitting. First insert the main body of the male-end connector into the fitting space of the female-end connector, and after the convex buckle of the body is buckled in the buckle groove of the base, the plurality of conductive terminals of the main body can bee resisted and contacted with the corresponding contact terminals on the base to form an electrical connection, so as to realize the electrical connection between two parallel and opposite circuit boards, or between flexible circuit boards, cables and circuit boards.

However, when it is desired to insert the plug connector with wires into the socket connector located on the board end to form mutual matching, it is necessary to rely on the metal shells respectively located on the two electrical connectors to engage and ground each other, so as to eliminate electromagnetic waves generated by the two electrical connectors during high-speed transmission of electronic signals. However, the plurality of contact shrapnels of the conventional two metal shells are located outside the socket connector. Because the multiple contact shrapnels need to form multi-point contacts, they are designed to be very small and thin. Therefore, after repeated plugging and unplugging of the second electrical connector, it is easy to cause the small contact shrapnels to be deformed irreversibly by the resisting stress, and further cause the problem of poor contact or even inaccessibility of some or all of the contact shrapnels. In this way, effective electromagnetic wave shielding and elimination effects cannot be formed.

Therefore, how to solve the lack and inconvenience of the above-mentioned prior art designs is the direction that the relevant parties in this industry want to study and improve.

SUMMARY OF THE INVENTION

Therefore, in view of the above-mentioned problems and deficiencies, the inventor collected relevant information, and after various evaluations and considerations, he designed this invention of shell grounding structure of electrical connector.

The main object of the present invention is to provide a shell grounding structure of electrical connector, which comprises a board-end connector and a wire-end connector. The board-end connector comprises a housing with a docking space therein, a plurality of conductive terminals pierced on two opposite sides of the docking space, and a metal shell assembled on the outside of the housing. The wire-end connector comprises a holder base, a plurality of contact terminals and a shielding shell. The holder base comprises an inserting portion located on a bottom side thereof and combined with the docking space. The contact terminals pierce the inserting portion and are in contact with the conductive terminals respectively and electrically. The contact terminals each comprise a connecting portion arranged on the top surface of the holder base and respectively electrically connected with a respective one of a plurality of electrical cables. The holder base is externally assembled with the shielding shell. The shielding shell comprises a cable opening located on one side thereof for the cables to be exposed, and a hooking plate located on the outside of the metal shell opposite to the cable opening. The hooking plate comprises a plurality of resisting elastic pieces extending toward the metal shell and forming contact. Because the hooking plate of the shielding shell of the wire-end connector has a large volume, the multiple resisting elastic pieces can all allocate a large space, and each resisting elastic piece can be designed to be relatively wide and thick, and the free end forms a resisting surface that is vertically attached to the surface of the metal shell of the board-end connector. The board-end and wire-end connectors that are compatible with each other can maintain their original shape after repeated plugging and unplugging without deformation. The resisting contact structure between the metal shell and the shielding shell can then be confirmed, so that the shell grounding structure of electrical connector has a good effect of electromagnetic wave shielding and elimination.

Preferably, the metal shell further comprises two button holes two opposite sides, and the shielding shell is mounted with a handle and further comprises two shaft holes respectively located on two sides corresponding to the button holes. The handle comprises two opposite shaft portions respectively extending through the shaft holes into the button holes of the metal shell to make a limit.

Preferably, the handle comprises a long strip-shaped base rod, and two side rods respectively extended from two opposite ends of the base rod toward one side. The two side rods are turned toward an opposite inner side to form the respective shaft portions.

Preferably, the resisting elastic pieces of the shielding shell are stamped to extend from the hooking plate and turn toward an inner side, so that a resisting surface is formed at the free end of each resisting elastic piece and vertically attached to the surface of the metal shell.

Preferably, the hooking plate of the shielding shell has at least one protruding buckle at the turning point of the top side, and the inner side of the base rod of the handle is provided with at least one buckle portion that corresponds to and can be rotatably engaged with the at least one protruding buckle.

Preferably, the holder base comprises a plurality of wire grooves located on a top side thereof and arranged at intervals and respectively facing the connecting portions of the contact terminals, and the cables are respectively pierced with a respective wire core that is welded to the connecting portion of one respective contact terminal.

DETAILED DESCRIPTION OF THE PREFERRED EMBODIMENT

Figure 1:
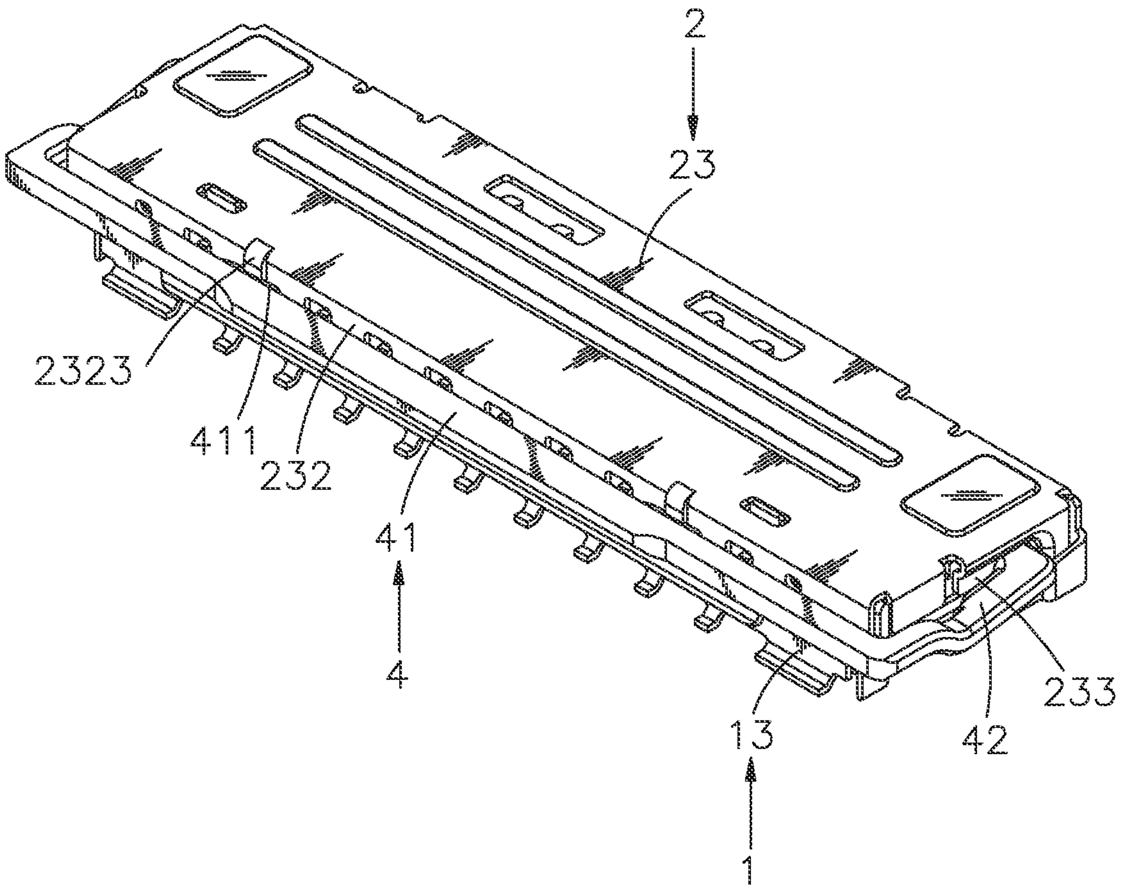
FIG. 1 is a three-dimensional appearance view of the shell grounding structure of electrical connector of the present invention after combination.
Figure 2:
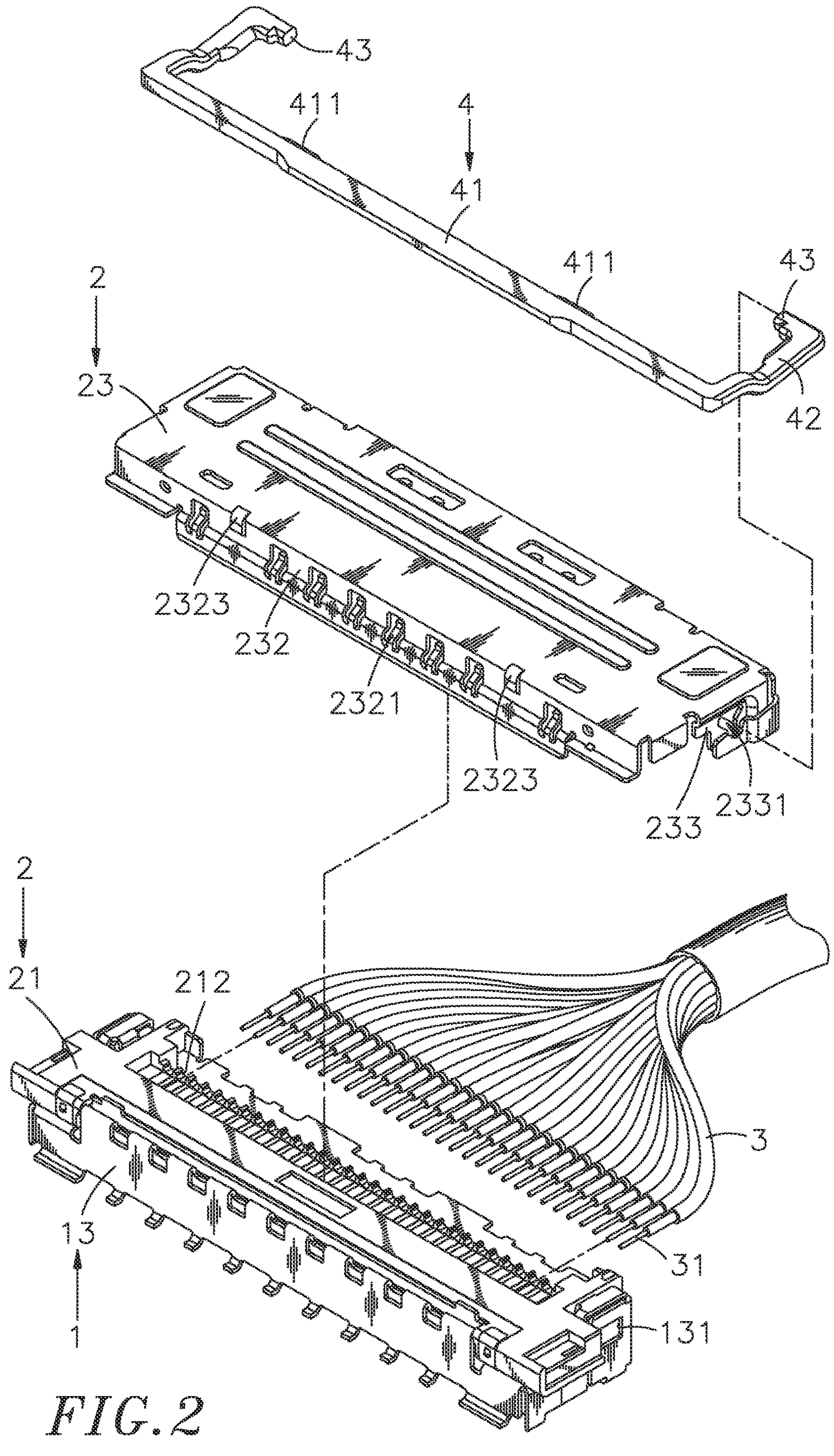
FIG. 2 is a partial three-dimensional exploded view of the shell grounding structure of electrical connector of the present invention.
Figure 3:
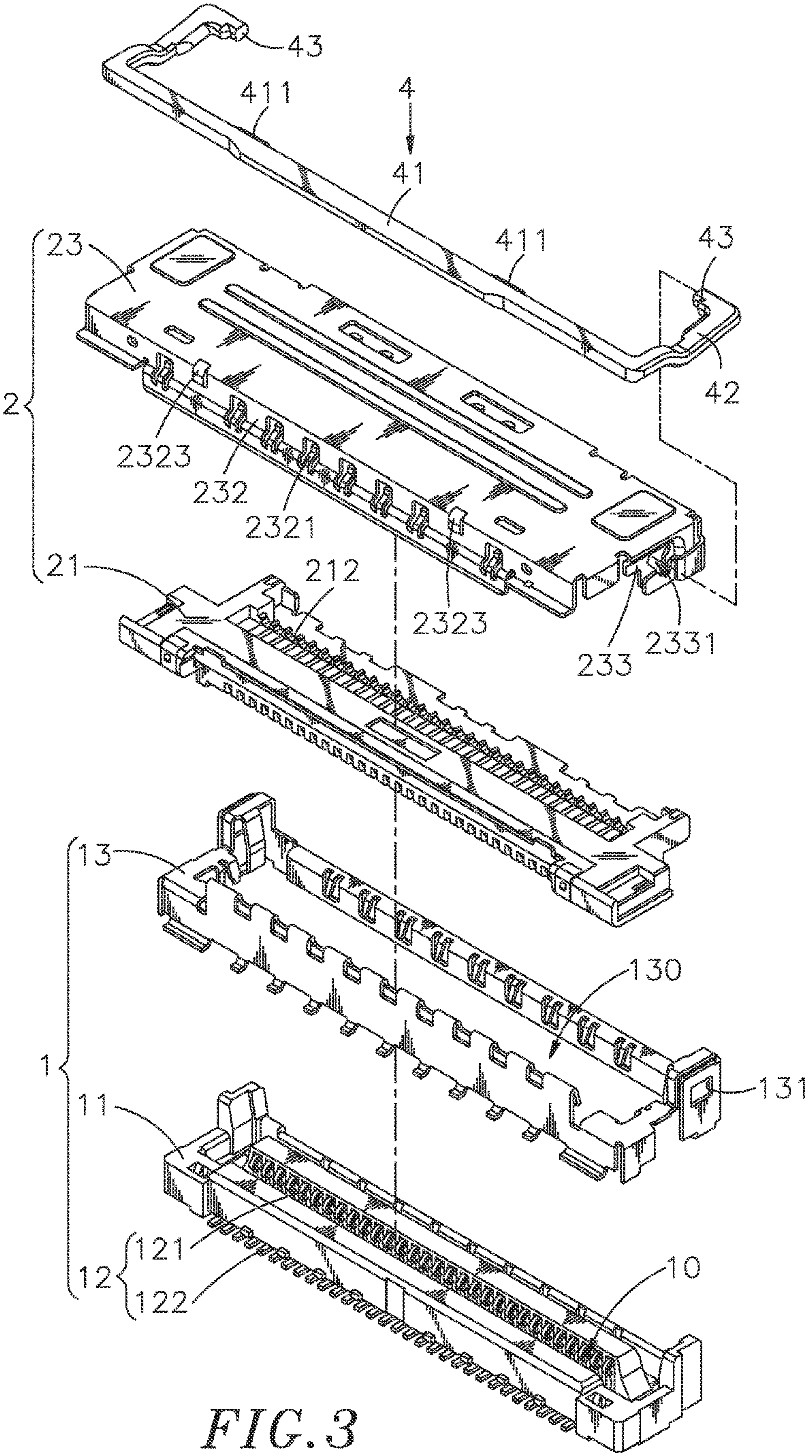
FIG. 3 is a more detailed three-dimensional exploded view of the shell grounding structure of electrical connector of the present invention.
Figure 4:
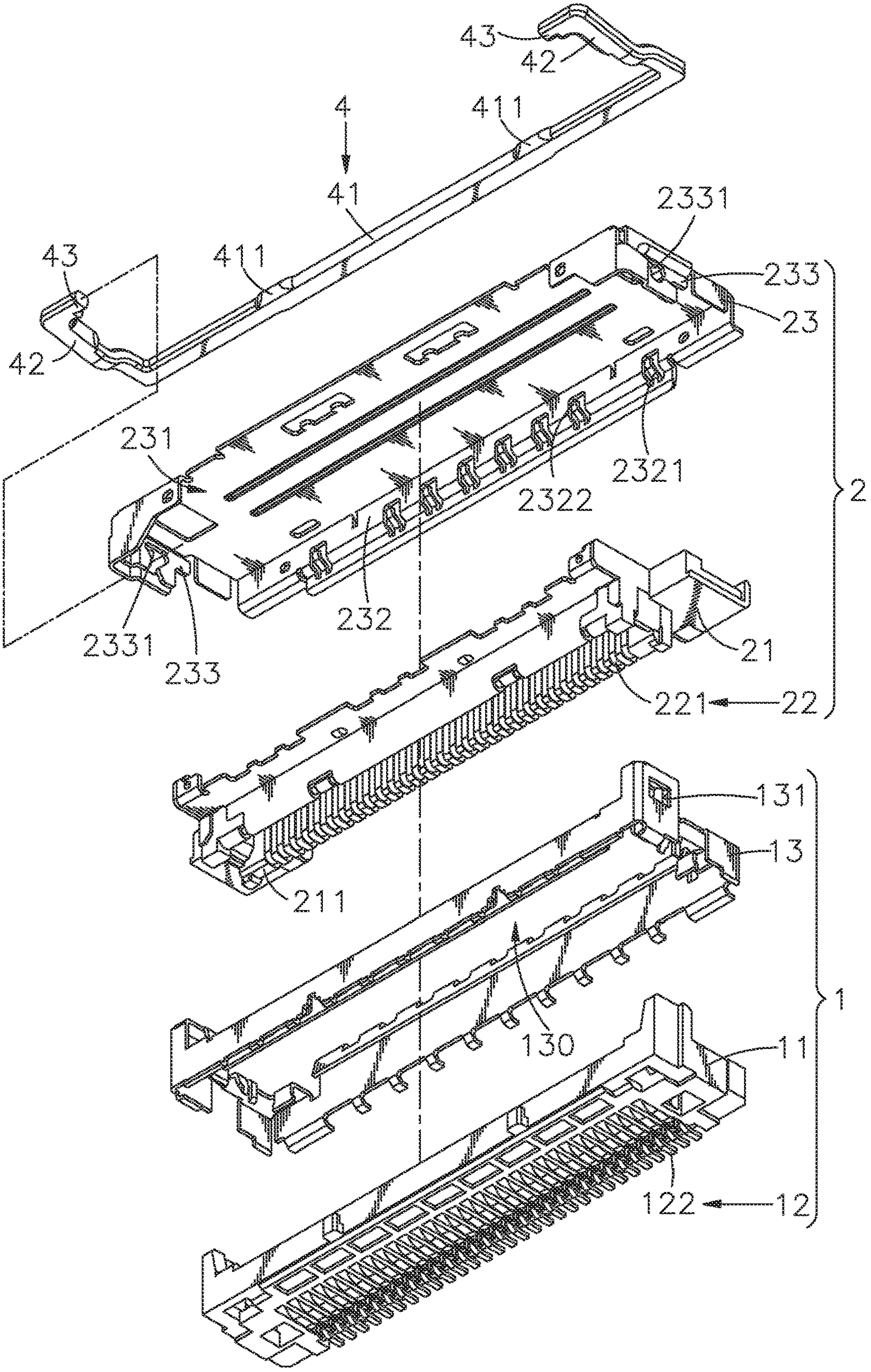
FIG. 4 is a more detailed three-dimensional exploded view of another perspective of the shell grounding structure of electrical connector of the present invention.
Figure 5:
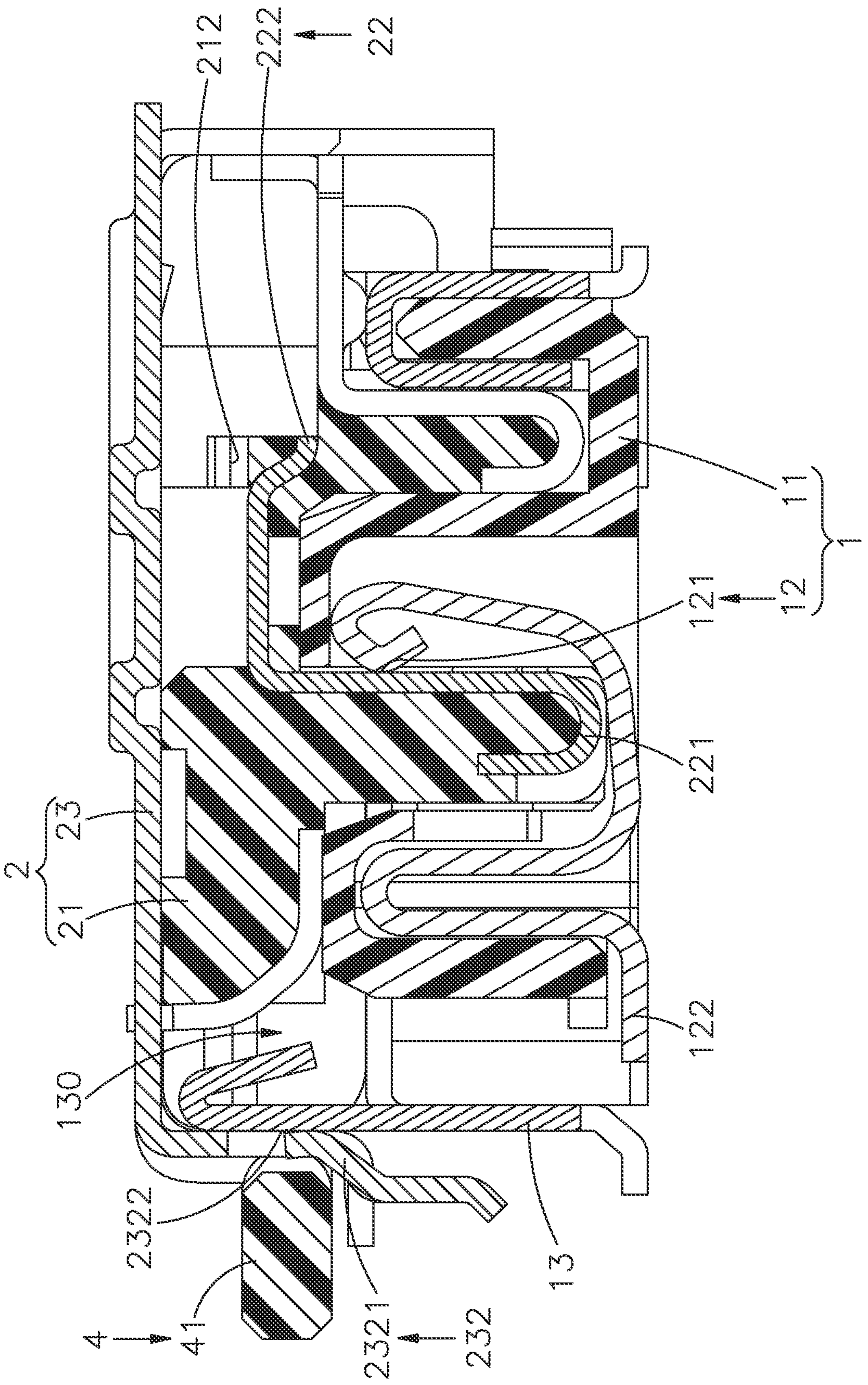
FIG. 5 is a cross-sectional side view of the shell grounding structure of electrical connector of the present invention after combination.

Referring to FIGS. 1-5, which are a three-dimensional appearance view, a partial three-dimensional exploded view, a more detailed three-dimensional exploded view, a more detailed three-dimensional exploded view of another perspective and a cross-sectional side view of the shell grounding structure of electrical connector of the present invention after combination. It can be clearly seen from the figures that the shell grounding structure of electrical connector of the present invention mainly comprises: a board-end connector 1 and a wire-end connector 2. The detailed structure and connection relationship of the aforementioned components are as follows:

The board-end connector 1 comprises a housing 11 with a docking space 10, a plurality of conductive terminals 12 pierced on both sides of the docking space 10, and a metal shell 13 assembled on the outside of the housing 11.

The wire-end connector 2 comprises a holder base 21, a plurality of contact terminals 22, and a shielding shell 23. The holder base 21 comprises an inserting portion 211 located on the bottom side and combined with the docking space 10. The contact terminals 22 pierce the inserting portion 211 and are in contact with the conductive terminals 12 to form electrical connections. The contact terminals 22 each have a connecting portion 222 arranged on the top surface of the holder base 21 and respectively electrically connected with a respective one of a plurality of electrical cables 3. The holder base 21 is externally assembled with the shielding shell 23. The shielding shell 23 has a cable opening 231 located on one side for the cables 3 to be exposed, and a hooking plate 232 located on the outside of the metal shell 13 opposite to the cable opening 231. The hooking plate 232 has a plurality of resisting elastic pieces 2321 extending toward the metal shell 13 and forming contact.

The metal shell 13 mentioned above is provided with a perforation 130 for exposing the docking space 10. The shielding shell 23 further has two shaft holes 2331 respectively located on the two sides for two opposite shaft portions 43 of a handle 4 to extend into and locate respectively. The two shaft portions 43 of the handle 4 extend into the button holes 131 on both sides of the metal shell 13 to make a limit. The handle 4 comprises a long strip-shaped base rod 41, and two side rods 42 respectively extended from two opposite ends of the base rod 41 toward one side, and the two side rods 42 are turned toward the opposite inner side to form the shaft portions 43.

The resisting elastic pieces 2321 of the above-mentioned shielding shell 23 are stamped to extend from the hooking plate 232 and turn toward an inner side, so that a resisting surface 2322 is formed at the free end of each resisting elastic piece 2321 and vertically attached to the surface of the metal shell 13. The hooking plate 232 of the shielding shell 23 has at least one protruding buckle 2323 at the turning point of the top side, and the inner side of the base rod 41 of the handle 4 is provided with at least one buckle portion 411 that corresponds to and can be rotatably engaged with the at least one protruding buckle 2323.

The above-mentioned holder base 21 has a plurality of wire grooves 212 located on the top and arranged at intervals and respectively facing the connecting portions 222 of the contact terminals 22. The cables 3 are respectively pierced with a respective wire core 31 that is welded to the connecting portion 222 of one respective contact terminal 22.

The above-mentioned conductive terminals 12 each further comprise a docking portion 121 located on one end and disposed in contact with one respective contact terminal 22 to form an electrical connection, and a welding portion 122 extended and bent from the opposite end and welded to a predetermined circuit board (not shown in the figures).

The above-mentioned contact terminals 22 each further comprise a contact portion 221 located on one end and disposed in contact with one respective conductive terminal 12 to form an electrical connection, and the connecting portion 222 is bent from the opposite end and extended into the top surface of the holder base 21.

In the actual assembly operation of the shell grounding structure of electrical connector of the present invention, the board-end connector 1 can first place the welding portions 122 of the plurality of conductive terminals 12 electrically connected to the multiple contacts on the surface of the preset circuit board (not shown in the figures) by surface mount technology (SMT), through hole or other electrical connection methods. When the board-end connector 1 and the wire-end connector 2 are docked with each other, the handle 4 set on the wire-end connector 2 can be turned upward first, and the side rods 42 on both sides of the handle 4 are pushed by a top side flange of a side plate 233 of the shielding shell 23 and are relatively outwardly stretched, then assemble the holder base 21 of the wire-end connector

2 downwards to the housing 11 of the board-end connector 1, so that the inserting portion 211 of the holder base 21 is inserted into the docking space 10 of the housing 11. At this time, the contact portions 221 of the plurality of contact terminals 22 are in electrical contact with the docking portions 121 of the plurality of conductive terminals 12 to form an electrical conduction state. At the same time, the plurality of resisting elastic pieces 2321 of the hooking plate 232 are in contact with the surface of the metal shell 13 and electrically connected to the grounding area of the predetermined circuit board, so as to eliminate electromagnetic waves generated by the two electrical connectors when transmitting electronic signals at high speed. Then turn the base rod 41 of the handle 4 towards the hooking plate 232 of the shielding shell 23 to move the at least one buckle portion 411 on the base rod 41 of the handle 4 over the at least one protruding buckle 2323 of the hooking plate 232 to form a snap fit. Thereafter, the side rods 42 of the handle 4 are elastically reset, so that the shaft portions 43 of the handle 4 are snapped into the button holes 131 on both sides of the metal shell 13, so that the board-end connector 1 and the wire-end connector 2 are stably locked into one body.

When you want to separate the wire-end connector 2 from the board-end connector 1, you can turn the base rod 41 of the handle 4 to the upper position, and the side rods 42 on the two sides of the handle 4 are pushed against by the top side flange of the side plate 233 of the shielding shell 23 again and are relatively outwardly stretched. In this way, the two shaft portions 43 of the handle 4 are separated from the button holes 131 on both sides of the metal shell 13, so that the board-end connector 1 and the wire-end connector 2 are in an unlocked state. Then pull the wire-end connector 2 upwards, so that the contact portions 221 of the plurality of contact terminals 22 are separated from the docking portions 121 of the plurality of conductive terminals 12, so as to achieve the purpose of separating the two electrical connectors.

The main feature of the shell grounding structure of electrical connector of the present invention is that the hooking plate 232 of the shielding shell 23 of the wire-end connector 2 has a larger volume, so that the plurality of resisting elastic pieces 2321 arranged therein can all allocate a larger space. Therefore, each resisting elastic piece 2321 can be designed to be relatively wide and thick, and the resisting surface 2322 formed on the free end can be vertically attached to the surface of the metal shell 13, and the board-end and wire-end connectors (1, 2) that are compatible with each other can maintain their original shape after repeated plugging and unplugging without deformation. The resisting contact structure between the metal shell 13 and the shielding shell 23 can then be confirmed, so that the shell grounding structure of electrical connector has a good effect of electromagnetic wave shielding and elimination. The invention has excellent practicability in the field of electrical connector manufacturing, so a patent application is filed to seek patent protection.

The above description is only a preferred embodiment of the present invention, and does not limit the patent scope of the present invention. Therefore, all simple modifications and equivalent structural changes made by using the description and drawings of the present invention should be included in the scope of the patent of the present invention in the same way, and are hereby declared.

In summary, the above-mentioned shell grounding structure of electrical connector of the present invention can really achieve its effect and purpose when used, so the present invention is an invention with excellent practicability. In order to meet the application requirements for invention patents, please file an application in accordance with the law. I hope that the review committee will approve this case as soon as possible to protect the hard work of the inventor. If the review committee has any doubts, please feel free to write to us. The inventor will do his best to cooperate.

What the invention claimed is:

1. A shell grounding structure of electrical connector, comprising:

a board-end connector comprising a housing with a docking space therein, a plurality of conductive terminals pierced on two opposite sides of said docking space, and a metal shell assembled on an outside of said housing; and a wire-end connector comprising a holder base, a plurality of contact terminals and a shielding shell, said holder base comprising an inserting portion located on a bottom side thereof and combined with said docking space, said contact terminals piercing said inserting portion and being in contact with said conductive terminals respectively and electrically, said contact terminals each comprising a connecting portion arranged on a top surface of said holder base and respectively electrically connected with a respective one of a plurality of electrical cables, said holder base being externally assembled with said shielding shell, said shielding shell comprising a cable opening located on one side thereof for said cables to be exposed and a hooking plate located on an outside of said metal shell opposite to said cable opening, said hooking plate comprising a plurality of resisting elastic pieces extending toward said metal shell and forming contact.

2. The shell grounding structure of electrical connector as claimed in claim 1, wherein said metal shell further comprises two button holes two opposite sides; said shielding shell is mounted with a handle and further comprises two shaft holes respectively located on two sides corresponding to said button holes, said handle comprising two opposite shaft portions respectively extending through said shaft holes into said button holes of said metal shell to make a limit.

3. The shell grounding structure of electrical connector as claimed in claim 2, wherein said handle comprises a long strip-shaped base rod, and two side rods respectively extended from two opposite ends of said base rod toward one side, said two side rods being turned toward an opposite inner side to form respective said shaft portions.

4. The shell grounding structure of electrical connector as claimed in claim 1, wherein said resisting elastic pieces of said shielding shell are stamped to extend from said hooking plate and turn toward an inner side, so that a resisting surface is formed at a free end of each said resisting elastic piece and vertically attached to a surface of said metal shell.

5. The shell grounding structure of electrical connector as claimed in claim 1, wherein said holder base comprises a plurality of wire grooves located on a top side thereof and arranged at intervals and respectively facing said connecting portions of said contact terminals; said cables are respectively pierced with a respective wire core that is welded to said connecting portion of one respective said contact terminal.

6. The shell grounding structure of electrical connector as claimed in claim 1, wherein said conductive terminals each comprise a docking portion located on one end thereof and disposed in contact with one respective said contact terminal to form an electrical connection, and a welding portion extended and bent from an opposite end thereof and welded to a predetermined circuit board.

7. The shell grounding structure of electrical connector as claimed in claim 1, wherein said contact terminals each further comprise a contact portion located on one end thereof and disposed in contact with one respective said conductive terminal to form an electrical connection, and said connecting portion of each said contact terminal is bent and extended from an opposite end of said contact portion into said top surface of said holder base.

* * * * *